United States Patent [19]

Weiss

[11] Patent Number: 4,754,941
[45] Date of Patent: Jul. 5, 1988

[54] PIPE SUPPORT COLLAR

[76] Inventor: Jacques Weiss, 48, rue du 19 Janvier, 92380 Garches, France

[21] Appl. No.: 940,944

[22] Filed: Dec. 12, 1986

[30] Foreign Application Priority Data

Dec. 13, 1985 [FR] France ................................ 85 18650

[51] Int. Cl.$^4$ ................................................ F16L 3/08
[52] U.S. Cl. ...................... 248/74.3; 248/313
[58] Field of Search ............. 248/74.1, 74.2, 74.3, 248/74.4, 74.5, 154, 313, 231; 24/279, 280, 281, 282

[56] References Cited

U.S. PATENT DOCUMENTS

| 991,192 | 5/1911 | Battenfeld | 248/74.3 |
| 1,070,952 | 8/1913 | Erickson | 24/279 |
| 1,442,909 | 1/1923 | Ryan | 24/279 V X |
| 1,963,908 | 6/1934 | Manasek | 248/74.1 |
| 2,338,145 | 1/1944 | Webb | 248/74.3 X |
| 2,817,136 | 12/1957 | Zartler | 24/279 |
| 2,828,525 | 4/1958 | Gail | 24/279 |
| 3,477,106 | 11/1969 | Tetzlaff et al. | 24/279 |
| 4,032,096 | 6/1977 | Perrault | 248/74.3 X |

FOREIGN PATENT DOCUMENTS 2395418 6/1977 France ............................. 248/74.1

Primary Examiner—J. Franklin Foss
Attorney, Agent, or Firm—Kuhn and Muller

[57] ABSTRACT

The collar of the invention includes two half-collars (1,2), one of them, fixed, including a means of attachment (3-5) to the support wall in its intermediate part, and the other removable half-collar is assembled on the first half-collar. It is associated with reinforcing element (14), generally of rectangular form, interposed between the support wall and one of the sides of fixed half-collar (1) to support the weight of the pipe.

10 Claims, 1 Drawing Sheet

PIPE SUPPORT COLLAR

FIELD OF THE INVENTION

The invention relates to collars serving to support pipes and pipelines running along vertical and horizontal walls of buildings.

BACKGROUND OF THE INVENTION

Collars of the type including two semicircular elements, one fixed element presenting a means for attachment to the wall (such as a screw, sealing flap, or band through which a bolt passes) in its intermediate part and a removable element assembling on the fixed element to lock the collar and secure the pipe is simple and inexpensive, is well suited for supporting pipes in horizontal position, for example on a platform, or for maintaining pipes in vertical position along a wall. It is less well suited for supporting pipes in horizontal position along a wall, because in that case the weight of the pipe is improperly supported and tends to deform the collar. Special supports including a fixed element in hook form dimensioned to support the weight of the pipe are also generally used in the latter case. This concept is technically more satisfactory, but it is more costly than that of the above mentioned collar. Moreover, the installer is compelled to always have these two types of collars in stock or at his disposal in the work yard to make all the installations required.

SUMMARY OF THE INVENTION

The object of the invention is that of making it possible to always use the same kind of collar in all cases by easy adaptation according to the positions of the pipes to be installed. For this purpose, it relates to a pipe or piping support collar including two semicircular half-collars, one of them fixed, presenting a means of attachment to the wall in its intermediate part, and a removable half-collar assembling over the first element, characterized by the fact that it is combined with a reinforcing element, usually of rectangular form, interposed between the support wall and one of the sides of the fixed half-collar. This reinforcing element is preferably removable, and it is used only when the collar is attached to a vertical wall to support a pipe in horizontal position.

BRIEF DESCRIPTION OF THE DRAWINGS

These and further objects and advantages of the invention will be more apparent upon referring to the following specification, claims and attached drawings in which:

DESCRIPTION OF THE PREFERRED EMBODIMENT

Figure 1:
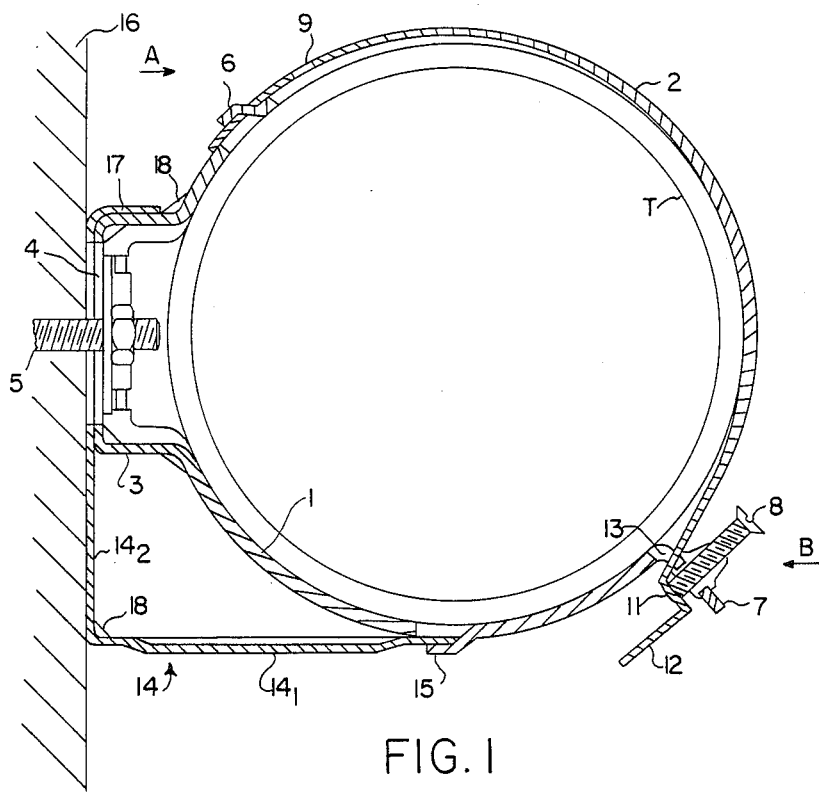
FIG. 1 is a side view in cross-section of the collar of the invention attached to a vertical wall to support a pipe in horizontal position.

In the two examples shown in the Figures, the collar consists of two semicircular half-collars, 1,2, formed from a cut and folded metal band. Half-collar 1 is attached to vertical wall 16 by attachment bolt 5 which extends through hole 4 at an intermediate portion of support band 3. The attachment is secured by a screw nut inserted freely on a plate applied over the inner surface of the support band. This plate is retained by folded flaps of the support band 3, which serves the purpose of permitting regulation of the position of the collar at the moment of its attachment to the wall 16.

Extending from one end of half-collar 1 is tongue 6 cut and folded towards the outside for hanging removable half-collar 2. The other end of half-collar 1 forms flap 7, folded radially and bearing set screw 8. Half-collar 2 is provided with one or more holes 9 at one end to cooperate with tongue 6 of half-collar 1 and at the other end, shortened tongue 10 is bent radially at 11 and extended by part 12 forming a guide for introducing this tongue 10 into hole 13 of flap 7 in order to conduct its part 11 beneath the end of set screw 8. The same collar can be used for pipes of a little different diameters with most hanging holes 9 and with the course of set screw 8.

Figure 2:
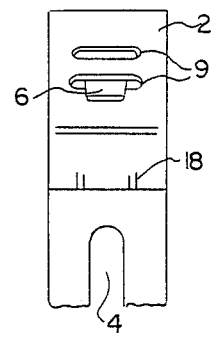
FIG. 2 is a partial view in the direction of A of the collar of FIG. 1.
Figure 3:
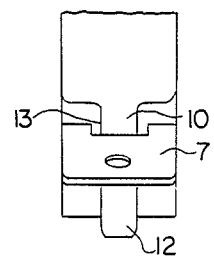
FIG. 3 is partial view in the direction of B of the collar of FIG. 1.
Figure 4:
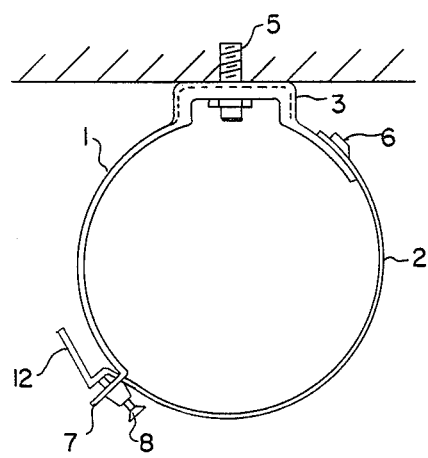
FIG. 4 shows the collar of FIG. 1 attached to a vertical wall without the reinforcing element.

It is to be noted that assembly means 6-9 and 8-10 of the half-collars are arranged along a diameter inclined at an angle of about 45° in relation to the diameter plane passing through attachment support 3. This avoids having a projection on either side of the collar and thus makes it possible to install pipes in parallel and almost against each other. In the embodiment shown in FIG. 1, reinforcing element 14 is formed with a metal band folded in generally rectangular form, with horizontal branch $14_1$, which supports the lower side of fixed half-collar 1. It presents cut tongue 15 folded towards the outside and forming a support on which the end of branch $14_1$ is supported for this purpose. This branch thus acts as a support leg to support the reaction of the weight of pipe T installed in the collar. The other vertical branch $14_2$ of the reinforcing element 14 rests on vertical wall 16, and it is extended so as to be secured between support band 3 and the wall. Its end is bent at 17 to be supported on the upper side of support band 3. A rubber pad may be interposed between the support band and reinforcing element 14 to provide vibration damping and sound insulation for the collar. The collar of the invention may be used without reinforcing element 14 to support the pipe T in horizontal position under a platform or in vertical position along a wall, i.e. when the position of the installed pipe does not exert a side force effect against the collar. Reinforcing element 14 forms a simple and inexpensive part in comparison with a support especially designed to install a pipe in horizontal position. This element may be designed in various ways, but the most advantageous of them appears to be the technique of the cut and folded band, if necessary stamped to form grooves or ribs such as 18 (FIG. 2) for stiffening the part, especially in the area of the reentering angles of the folded parts.

Figure 5:
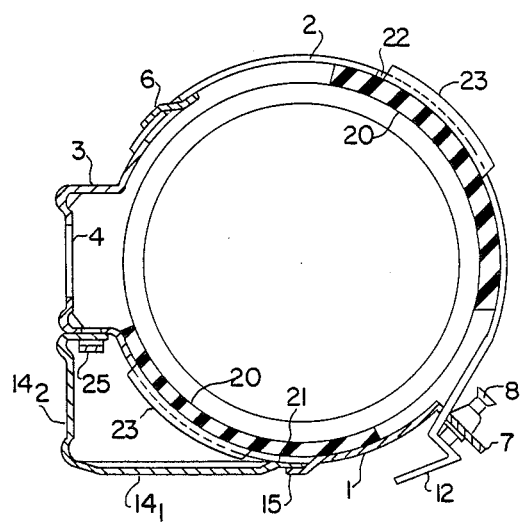
FIG. 5 shows another embodiment of the collar of the invention in vertical cross-section.

In FIG. 5 is shown another form of execution of reinforcing element 14, in which vertical branch 14 of that element is folded to be supported on support band 3 of fixed half-collar 1. The end of that branch forms a shortened flap which is inserted into opening 25 cut in the lower surface of support band 3 in order for element 14 to form a single unit with half-collar 1. The outside surface of support band 3 and that of branch 14 may be concave in their central part to be unaffected by defects in evenness of wall 16. FIG. 5 also shows the use of the collar with rapid attachment shims 20, making it possible to use the same collar diameter for pipes of different diameters. Both half-collars 1, 2 are provided with median groove 21, 22, making it possible to adapt semicircular shims 20. The latter are provided with outwardly extending protudences or back grooves 23, slotted longitudinally to give them elasticity, which makes it possible to mount them on the collar by catching their protudences 23 in the corresponding grooves 21, 22 of the half-collars. These shims 20 are advantageously made of a flexible material to assure antivibration insulation of the pipes.

Other modifications may be introduced into the collars described above. For example, it is possible to design fixed half-collar 1 with a metal band thicker than that of half-collar 2 in order for it to cooperate more effectively with reinforcing element 14 in supporting the weight of the pipe.

What is claimed is:

1. Pipe support collar comprising two removable semicircular half-collars, one of them being a first fixed half-collar adapted to be attached to a supporting surface by attachment means at an intermediate part thereof and the other being a removable half-collar adapted to be assembled on the first half-collar, said support collar having a separable reinforcing element associated therewith adapted to be interposed between a support wall and one of the sides of the fixed half-collar intermediate said attachment means and an end of said fixed collar.

2. Collar in accordance with claim 1, in which reinforcing element (14) is removable in relation to the fixed half-collar (1).

3. Collar in accordance with claim 1, in which the reinforcing element presents horizontal branch (14), whose end is supported on support (15) on the lower side of the fixed half-collar.

4. Collar in accordance with claim 1 or claim 3 in which the reinforcing element includes a vertical branch supported on the attachment means of the fixed half-collar.

5. Collar in accordance with claim 4, in which the vertical branch of the reinforcing element is secured between the wall and an attachment surface of the collar.

6. Collar in accordance with claim 4 characterized by the fact that the assembly means (6-9, 8-11) of the half-collars are displaced at an angle of about 45 in relation to an axial plane passing through the attachment means (3-5) of the fixed half-collar.

7. Collar in accordance with claim 4, characterized by the fact that each half-collar is provided with an interchangeable shim (20) adapted to be interposed between the collar and a pipe on its semicircular bearing surface.

8. Collar in accordance with claim 7, in which shims (20) present a back groove catching in a corresponding groove of each half-collar.

9. Collar in accordance with claim 1 in which said attachment means includes an elongated hole which permits regulation of the position of said fixed half-collar when attaching to a supporting surface.

10. Pipe support collar comprising two removable semicircular half-collars, one of them being a first fixed half-collar adapted to be attached to a supporting surface at an intermediate part thereof and the other being a removable half-collar, said support collar being associated with a reinforcement element, generally of rectangular form adapted to be interposed between a support wall and one of the sides of the fixed half-collar, said reinforcing element including a horizontal branch whose end is supported on the lower side of the fixed half-collar and a vertical branch which is folded to be supported on the attachment means of the fixed half-collar and is secured between the wall and an attachment surface of the collar.

* * * * *